US 6,462,111 B1

(12) United States Patent
Singh et al.

(10) Patent No.: US 6,462,111 B1
(45) Date of Patent: Oct. 8, 2002

(54) TRANSLUCENT FLAME RETARDANT POLYCARBONATE COMPOSITIONS

(75) Inventors: Rajendra Kashinath Singh; Niles Richard Rosenquist, both of Evansville; John Michael Fischer, Mt. Vernon, all of IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,288

(22) Filed: Dec. 10, 2001

(51) Int. Cl.$^7$ .............................. C08K 5/15; C08K 5/41; C08K 5/42
(52) U.S. Cl. ................ 524/108; 524/156; 524/157; 524/158
(58) Field of Search ................ 524/108, 156, 524/157, 158

(56) References Cited

U.S. PATENT DOCUMENTS

| | | | |
|---|---|---|---|
| 3,635,895 A | 1/1972 | Kramer | 260/47 |
| 3,751,519 A | 8/1973 | Bostick et al. | 260/824 |
| 3,775,367 A | 11/1973 | Nouvertne | 260/45.9 |
| 3,775,369 A | 11/1973 | Uraneck et al. | 260/63 |
| 3,971,756 A | 7/1976 | Bialous et al. | 260/45.7 |
| 4,001,184 A | 1/1977 | Scott | 260/47 |
| 4,130,530 A | 12/1978 | Mark et al. | 260/29.1 |
| 4,217,438 A | 8/1980 | Brunelle et al. | 528/202 |
| 4,391,935 A | 7/1983 | Bialous et al. | 524/82 |
| 4,753,994 A | 6/1988 | Carter, Jr. et al. | 525/146 |
| 4,767,818 A | 8/1988 | Boutni | 524/505 |
| 5,102,696 A | 4/1992 | Pan et al. | 427/222 |
| 5,449,710 A | 9/1995 | Umeda et al. | 524/164 |
| 5,521,230 A | 5/1996 | Bhatia et al. | 523/328 |
| 5,773,493 A | 6/1998 | Bhatia et al. | 523/328 |
| 6,001,929 A | 12/1999 | Nodera et al. | 525/92 |
| 6,005,025 A | 12/1999 | Bhatia et al. | 523/206 |
| 6,072,011 A | 6/2000 | Hoover et al. | 525/464 |
| 6,160,038 A | 12/2000 | Bhatia et al. | 523/206 |
| 6,180,702 B1 | 1/2001 | Chung et al. | 524/161 |

FOREIGN PATENT DOCUMENTS

| | | |
|---|---|---|
| EP | 0 899 303 A2 | 8/1998 |
| JP | 7-258532 | 10/1995 |

*Primary Examiner*—Kriellion A. Sanders

(57) ABSTRACT

A fire retardant polycarbonate composition comprises branched polycarbonate resin, polytetrafluoroethylene, a fire retardant free of bromine and chlorine, and an optional siloxane.

24 Claims, No Drawings

TRANSLUCENT FLAME RETARDANT POLYCARBONATE COMPOSITIONS

BACKGROUND OF THE INVENTION

This disclosure relates to polycarbonate compositions and particularly to flame retardant polycarbonate compositions.

Polycarbonate resins have been used extensively in the fabrication of business machines and telecommunications equipment due to excellent electrical properties, transparency and mechanical strength, especially impact strength. Business machines and telecommunications equipment are subject to stringent safety requirements, particularly in the area of fire retardancy. These safety requirements are difficult to achieve in thin wall articles, i.e. those with a wall thickness of less than about 2.5 millimeters (mm). Previous attempts to meet safety requirements in thin wall articles include employing polycarbonate with very low melt flow (high viscosity), and using linear polycarbonate combined with high levels of polytetrafluoroethylene or high levels of chlorinated or brominated fire retardants. Each of these approaches has drawbacks, however. Polycarbonates with low melt flow cannot be formed by injection molding. High levels of polytetrafluoroethylene result in translucent compositions with high levels of haze and low transparency, and it is becoming increasingly desirable for safety requirements to be met without using chlorinated or brominated fire retardants.

Thus, it is clear that meeting safety requirements in a translucent polycarbonate composition with low haze and high transparency without the use of chlorinated or brominated fire retardants is a significant challenge, especially in compositions useful in injection molding and/or thin wall applications.

SUMMARY OF THE INVENTION

The above-discussed and other drawbacks and deficiencies of the prior art are overcome or alleviated by a fire retardant, translucent polycarbonate composition comprising a branched polycarbonate resin, a polytetrafluoroethylene resin, and a fire retardant free of bromine and chlorine; wherein the polycarbonate composition has less than or equal to about 30% haze and greater than or equal to about 70% light transmission at a thickness of about 3.2 millimeters as well as a V1 rating or better at a thickness less than or equal to 2.5 millimeters according to UL 94.

In another aspect, a fire retardant, translucent polycarbonate composition comprises branched polycarbonate resin, polytetrafluoroethylene resin present in an amount less than about 0.10 weight percent based on the total weight of polycarbonate; and a fire retardant free of bromine and chlorine present in an amount of about 0.01 weight percent to about 0.15 weight percent based on the total weight of polycarbonate wherein the polycarbonate composition has a V1 rating or better at a thickness less than or equal to 2.5 millimeters according to UL 94.

In another embodiment, a fire retardant, translucent polycarbonate composition comprises a branched polycarbonate resin; polytetrafluoroethylene; a fire retardant free of bromine and chlorine; and a siloxane wherein the polycarbonate composition has a V1 rating or better at a thickness less than or equal to 2.5 millimeters according to UL 94.

In another embodiment, a fire retardant polycarbonate composition comprises linear and branched polycarbonate resins, polytetrafluoroethylene, a fire retardant free of bromine and chlorine, and a cyclic siloxane.

The above-described and other features will be appreciated and understood by those skilled in the art from the following detailed description and appended claims.

BRIEF DESCRIPTION OF DRAWINGS

Not applicable

DETAILED DESCRIPTION

A fire retardant, translucent polycarbonate composition comprises a branched polycarbonate resin, polytetrafluoroethylene, a fire retardant free of bromine and chlorine, and an optional siloxane. The translucent polycarbonate composition demonstrates good transparency and fire retardant properties. Transparency is described by the haze percentage and the light transmission percentage. Haze percentage and light transmission percentage as used herein are determined according to ASTM D1003. A translucent composition is defined herein as having a haze percentage less than or equal to about 30%, preferably less than or equal to about 26% and most preferably less than or equal to about 22% and a light transmission percentage greater than or equal to about 70%, preferably greater than or equal to about 73% and most preferably greater than or equal to about 75%, at a thickness of about 3.2 millimeters. Fire retardancy is determined according to Underwriter Laboratories protocol UL 94. UL 94 provides four possible ratings, HB, V2, V1, and V0. V0 is the most difficult rating to obtain, requiring that five bars self extinguish with an average flame out time of five seconds or less without dripping. A flame retardant composition is herein defined as having a V1 rating or better, preferably a V0 rating at thicknesses less than or equal to about 2.5 mm, preferably at thicknesses less than or equal to about 2.3 mm and most preferably at thicknesses less than or equal to about 2.0 mm. The translucent fire retardant polycarbonate composition described herein is free of chlorine and bromine, useful in injection molding, and capable of attaining a V0 rating at the thicknesses described above.

Polycarbonates are well known resins and are commercially available. Useful polycarbonates include compositions having structural units of the formula (I):

(I)

in which at least about 60 percent of the total number of $R^1$ groups are aromatic organic radicals and the balance thereof are aliphatic, alicyclic, or aromatic radicals. Polycarbonates can be produced by the interfacial reaction of dihydroxy compounds. As used herein, the term "dihydroxy compound" includes, for example, bisphenol compounds having general formula (II) as follows:

$$HO-A^1-Y^1-A^2-OH \qquad (II)$$

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^1$. Illustrative non-limiting examples of radicals of this type are—O—,—S—,—S(O)—,—S(O$_2$)—,—C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene. Preferably the dihydroxy compound has the general formula (III)

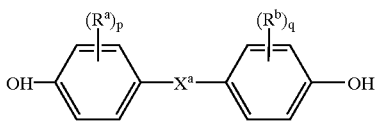

(III)

wherein $R^a$ and $R^b$ beach represent a hydrogen atom or a monovalent hydrocarbon group and may be the same or different; p and q are each independently integers from 0 to 4; and $X^a$ represents one of the groups of formula IV:

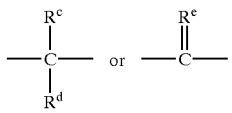

(IV)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable preferred dihydroxy compounds include the dihydroxy-substituted aromatic hydrocarbons disclosed by name or formula (generic or specific) in U.S. Pat. No. 4,217,438. A nonexclusive list of specific examples of the types of bisphenol compounds that may be represented by formula (III) includes the following:1,1-bis(4-hydroxyphenyl) methane; 1,1-bis (4-hydroxyphenyl) ethane; 2,2-bis(4-hydroxyphenyl) propane (hereinafter "bisphenol A"or "BPA"); 2,2-bis(4-hydroxyphenyl) butane; 2,2-bis(4-hydroxyphenyl) octane; 1, 1-bis(4-hydroxyphenyl) propane; 1,1-bis(4-hydroxyphenyl) n-butane; bis (4-hydroxyphenyl) phenylmethane; 2,2-bis(4-hydroxy-1-methylphenyl) propane; 1,1-bis (4-hydroxy-t-butylphenyl) propane; bis (hydroxyaryl) alkanes such as ; 1,1-bis (4-hydroxyphenyl) cyclopentane; and bis(hydroxyaryl) cycloalkanes such as 1,1-bis (4-hydroxyphenyl) cyclohexane.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed.

Branched polycarbonates may be prepared by adding a branching agent during polymerization. Branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane ("THPE"), 2,6-bis(2'-hydroxy-5'-methylbenzyl)-4-methylphenol, isatin-bis-phenol, tris-phenol TC (1,3,5-tris((p-hydroxyphenyl) isopropyl) benzene), tris-phenol PA (4(4(1,1-bis(p-hydroxyphenyl)-ethyl), 4-chloroformyl phthalic anhydride, trimesic acid and benzophenone tetracarboxylic acid. The branching agents may be added at a level of about 0.05–2.0 weight percent. Branching agents and procedures for making branched polycarbonates are described in U.S. Pat. Nos. 3,635,895 and 4,001,184. All or most types of polycarbonate end groups are contemplated as being useful in the flame retardant polycarbonate composition.

Preferred polycarbonates are based on bisphenol A. Preferably, the weight average molecular weight of the polycarbonate is about 5,000 to about 100,000, more preferably about 10,000 to about 65,000, and most preferably about 15,000 to about 40,000.

Preferably the composition comprises both linear and branched polycarbonate resins. Typically there is greater than or equal to about 70% by weight, preferably greater than or equal to about 75% by weight, and more preferably greater than or equal to about 80% by weight linear polycarbonate. Linear polycarbonate is typically present in amounts less than or equal to about 95% by weight, preferably less than or equal to about 90% by weight, and most preferably less than or equal to about 85% by weight. Generally there is greater than or equal to about 5% by weight branched polycarbonate, preferably greater than or equal to 10% by weight branched polycarbonate, and more preferably greater than or equal to about 15% by weight polycarbonate. Amounts of branched polycarbonate may be less than or equal to about 30% by weight, preferably less than or equal to about 25% by weight, and more preferably less than or equal to about 20% by weight. The preceding amounts of linear and branched polycarbonate are based on the total weight of polycarbonate. The branched polycarbonate has about 0.05 to about 0.8% branching, preferably about 0.1 to about 0.6% branching and most preferably about 0.2 to about 0.4% branching. The percentage of branching is determined by the number of branches per 100 repeating units. The final amount of branching in a composition is determined both by the ratio of branched resin to linear resin and the level of branching agent in the branched resin. For example a composition consisting of 80/20 ratio of linear to branched resin with 0.3% branching in the branched resin will have the same degree of branching as a composition consisting of 90/10 ratio of linear to branched resin, with 0.6% branching in the branched resin. Overall, the combination of linear and branched polycarbonate has about 0.01 to about 0.15% branching, preferably about 0.015 to about 0.09% branching and most preferably about 0.03 to about 0.075% branching.

Polytetrafluoroethylene resin is well known in the art. Polytetrafluoroethylene resin is typically a finely-divided solid that, when exposed to mechanical shear, has the ability to form ultrafine fibrils. Polytetrafluoroethylene is commercially available, typically as an aqueous suspension. It is preferable for ease of dispersion that the polytetrafluoroethylene resin particles be pre-dispersed in a resin matrix such as a thermoplastic resin for example, styrene-acrylonitrile as taught in European Patent Application No. 899 303. The encapsulated polytetrafluoroethylene resin particles typically have a particle size of about 35 to about 70 micrometers with about 40 to about 65 micrometers preferred. The polytetrafluoroethylene resin is typically employed in amounts less than about 0.1 weight percent (wt %), preferably less than or equal to about 0.075 wt %, and most preferably less than or equal to about 0.05 wt %, each based on the total weight of the polycarbonate. The fluorinated polyolefin must be employed in amounts effective to prevent dripping of the composition during heating, typically greater than or equal to about 0.025 wt %6.

Useful fire retardants are free of chloride and bromide. Typically this includes alkali and alkali metal salts of the following compounds that perform as fire retardants and do not result in opacity in polycarbonate compositions: monomeric or polymeric aromatic sulfonic acids; monomeric or polymeric aromatic sulfonesulfonic acids; sulfonic acids of aromatic ketones, heterocyclic sulfonic acids; fluorinated methanesulfonic acids; fluorinated non-aromatic carboxylic acids; sulfonic acids of aromatic sulfides; monomeric or polymeric aromatic ether sulfonic acids; aliphatic and olefinic sulfonic acids; unsubstituted or fluorinated oxocarbon acids; sulfonic acids of monomeric and polymeric aromatic carboxylic acids and esters; fluorocycloaliphatic aromatic sulfonic acids; monomeric or polymeric aromatic amide sulfonic acids; and mixtures comprising at least one of the foregoing alkali or alkali metal salts. Preferred salts include sodium and potassium perfuoroalkane sulfonic acid salts having from 1 to about 14 carbons (perfluoroalkane sulfonates); disodium naphthalene-2, 6-disulfonate; sodium 4,4'-difluorobiphenyl-3-sulfonate; sodium 2,3,4, 5,6-pentafluoro-betastyrenesulfonate; sodium 4,4'-difluorodiphenylsulfide-3-sulfonate; disodium tetrafluorodiphenyletherdisulfonate; disodium 4,4'-difluorobenzophenone-3, 3'-disulfonate; sodium 2,5-difluorothiophene-3-sulfonate; sodium salt of diphenylsulfone-3-sulfonic acid; potassium salt of diphenylsulfone-3-sulfonic acid, sodium dimethyl 2,4,6-trifluoro-5-sulfoisophthalate; potassium difluorophenyl 2,4, 5-trifluorobenzene sulfonate; calcium salt of 2,4, 5-trifluorobenzenesulfonamilide-4'-sulfonate; sodium 4'[1 ,4,5,6,7, 7-hexafluorobicyclo-[2.2.1 ]-hept-5-en-ando-2-yl]-benzenesulfonate; disodium hexafluoroglutarate;disodium fluoranilate; potassium trifluoromethane sulfonate; potassium perfluorobutane sulfonate and mixtures comprising at least one of the foregoing salts. Potassium perfluorobutane sulfonate is most preferred.

When the fire retardant is sodium perfluorobutane sulfonate, potassium perfluorobutane sulfonate or a mixture thereof, a useful amount is less than or equal to about 0.15% by weight, preferably less than or equal to about 0.12% by weight and more preferably less than or equal to 0.1% by weight, based on the total weight of polycarbonate. The sodium or potassium perfluorobutane sulfonate may also be present in amounts greater than or equal to 0.01% by weight, preferably greater than or equal to about 0.03% by weight, and most preferably greater than or equal to 0.05% by weight, based on the total weight of polycarbonate. Amounts of other fire retardants will vary with the identity of the fire retardant and are readily determined by one of ordinary skill in the art based on the teachings contained herein regarding the perfluorobutane sulfonate salts.

Useful siloxanes include, but are not limited to, cyclic siloxanes characterized by the following formula:

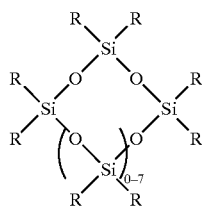

wherein each instance of R is independently selected from the group consisting of alkyl groups having 1 to about 36 carbon atoms, alkoxy groups having 1 to about 36 carbon atoms, aryloxy groups having about 6 to about 14 carbon atoms, arylalkoxy groups having about 7 to about 36 carbon atoms, aryl groups having 6 to about 14 carbon atoms, and alkyl substituted aryl groups having 6 to about 14 aryl carbon atoms wherein the alkyl substituent has 1 to about 30 carbon atoms. Preferably each instance of R is phenyl or phenoxy and more preferably the siloxane is selected from the group consisting of octaphenylcyclotetrasiloxane, octaphenoxycyclotetrasiloxane, and alkoxycyclosiloxanes. Octaphenylcyclotetrasiloxane is particularly preferred.

These cyclic siloxanes are prepared by methods known in the art. For example, they can be prepared by the hydrolysis of the halogen precursor or by isomerization or disproportionation of the linear polymers, as is known in the art.

Useful amounts of siloxane are less than or equal to about 0.25% by weight, preferably less than or equal to about 0.2% by weight, and more preferably less then or equal to 0.15% by weight. Siloxane is typically used in an amount greater than or equal to about 0.01% by weight, preferably greater than or equal to about 0.02% by weight, and more preferably greater than or equal to about 0.05% by weight, each based on the total weight of polycarbonate.

The fire retardant polycarbonate compositions may include conventional additives which are known in the art for inclusion in polycarbonate compositions. Such additives include but are not limited to stabilizers, mold release agents, light stabilizers, heat stabilizers, pigments and dyes.

The polycarbonate, polytetrafluoroethylene, fire retardant, and optional siloxane may be combined by blending the components using any of the blending means known for blending thermoplastics, such as blending in a kneading machine such as a Banbury mixer, Werner Pfleiderer blender, extruder or roll mill. Processing parameters should be chosen so as to maintain the integrity of the components of the composition and can be readily determined by one of ordinary skill in the art. The composition may then be formed into the desired article by any method known in the art, including injection molding. The compositions typically have a melt volume rate (MVR) of about 10 to about 20 $cm^3$/10 min, preferably about 13 to about 20 $cm^3$/10 min and most preferably about 15 to about 20 $cm^3$/10 min. Surprisingly, the translucent flame retardant polycarbonate composition is capable of attaining a V0 rating according to UL 94 protocols at a thickness of 2.0 mm.

The criteria for a flammability of V0 according to UL 94, is, briefly, as follows. With a sample placed so that its long axis is 90° to the flame, the average period of flaming and/or smoldering after removing the igniting flame should not exceed five seconds and none of the vertically placed samples should produce drips of burning particles that ignite absorbent cotton.

All patents cited are incorporated herein by reference.

The invention is further illustrated by the following non-limiting Examples.

EXAMPLES

The following examples employ the materials listed below. Molecular weights were determined using gel permeation chromatography with polycarbonate resin standards.

[t1]

| | |
|---|---|
| Branched PC | A branched polycarbonate resin containing 0.3 mole % of THPE with a weight average molecular weight of about 38,000 (mole % is defined as the molar amount of THPE that is co-polymerized with 100 moles of bisphenol A to make the branched polycarbonate). |

-continued

| | |
|---|---|
| Linear PC-1 | A linear bisphenol A polycarbonate with weight average molecular weight of about 22,000. |
| Linear PC-2 | A linear blsphenol A polycarbonate with weight average molecular weight of about 30,000. |
| PETS | Pentaerythritol tetrastearate, a mold release additive. |
| KPFBS | Potassium perfluorobutane sulfonate |
| TSAN | Polytetrafluoroethylene encapsulated in styrene acrylonitrile resin containing 50 wt % polytetrafluoroethylene. |
| Cyclic Siloxane | Octaphenylcyclotetrasiloxane. |

The examples shown below were prepared by conventional extrusion and molding. All amounts are given in parts by weight based on the total weight of polycarbonate. Flammability results are reported as "probability of first time pass" or p (FTP). Twenty bars were burned by the UL 94 method and the average and standard deviation of the flame out times was used to calculate the probability that in the standard test of five bars the sample would have passed. A 90% probability of passing the first time (i.e., p(FTP) of 0.9) is considered acceptable performance. Values significantly lower than 0.9 are considered unacceptable. p(FTP) is calculated only for samples that do not fail by dripping. Those are just noted as "drip". Flammability results were obtained for bars with a thickness of 2.3 mm and 2.0 mm. Melt volume rate was measured according to ASTM-D1238 using the conditions of 300 ° C. and 1.2 kg. The amount of haze and light transmission was measured according to ASTM D1003. The Yellowness Index (YI) was measured according to ASTM D1925.

Examples 1–6.

[t2]

TABLE 1

| | 1* | 2* | 3 | 4 | 5 | 6 |
|---|---|---|---|---|---|---|
| Linear PC-1 | 70% | 60% | 82% | 82% | 82% | 82% |
| Branched PC | — | — | 18% | 18% | 18% | 18% |
| Linear PC-2 | 30% | 40% | — | — | — | — |
| PETS | 0.35 | 0.35 | 0.35 | 0.35 | 0.35 | 0.35 |
| KPFBS | 0.08 | 0.08 | 0.08 | 0.08 | 0.08 | 0.08 |
| TSAN | — | 0.1 | 0.1 | 0.1 | 0.1 | 0.1 |
| Cyclic Siloxane | 0.1 | 0.1 | — | 0.1 | 0.125 | 0.15 |
| MVR | 17.51 | 14.92 | 15.63 | 14.46 | 15.6 | 15.24 |
| p [FTP] @ 2.0 mm | Drip | 0.4338 | 0.9985 | 0.9985 | 1 | 0.9999 |
| p [FTP] @ 2.3 mm | Drip | 0.9152 | — | — | — | — |
| % Haze | 0.8 | 10.1 | 26.1 | 18.2 | 21.4 | 18.3 |
| % Transmission | 90.7 | 77.3 | 74.2 | 78 | 76.4 | 77.7 |
| YI | 2.1 | 11.8 | 13.4 | 11.1 | 12.1 | 11.4 |

*Comparative example

The comparison of examples 3–6 to example 2 demonstrates that the inclusion of a branched polycarbonate in the composition results in a V0 rating at a thickness of 2.0 mm. A comparison of Example 3 to Example 4 demonstrates that the addition of the cyclic siloxane decreases the amount of haze and the yellowness index and increases the light transmission.

Examples 7–12 (Comparative).

[t3]

TABLE 2

| | 7 | 8 | 9 | 10 | 11 | 12 |
|---|---|---|---|---|---|---|
| Linear PC-1 | 84 | 80 | 76 | 84 | 80 | 76 |
| Branched Resin | 16 | 20 | 24 | 16 | 20 | 24 |
| PETS | 0.35 | 0.35 | 0.35 | 0.35 | 0.35 | 0.35 |
| KPFBS | 0.08 | 0.08 | 0.08 | 0.08 | 0.08 | 0.08 |
| Cyclic Siloxane | 0.1 | 0.1 | 0.1 | 0.125 | 0.125 | 0.125 |
| MVR, 6 min | 17.61 | 15.43 | 13.32 | 16.66 | 15 | 13.5 |
| MVR, 18 min | 17.62 | 15.15 | 13.42 | 16.88 | 14.86 | 13.65 |
| % Haze | 0.9 | 0.9 | 0.8 | 0.7 | 0.9 | 1.1 |
| % Transmission | 89.9 | 90.2 | 90.4 | 90.6 | 90.4 | 90.5 |
| YI | 2 | 1.7 | 1.7 | 1.5 | 1.4 | 1.6 |
| p (FTP) 2.3 mm | 0.5179 | Drip | 0.4576 | Drip | Drip | 0.1648 |

Examples 7–12 are comparative examples and do not contain polytetrafluoroethylene. Examples 7–12 do not demonstrate consistent V0 performance at 2.3 mm.

Examples 13–19.

[t4]

TABLE 3

| | 13* | 14 | 15* | 16* | 17 | 18* | 19* |
|---|---|---|---|---|---|---|---|
| Linear PC-1 | 82 | 82 | 82 | 82 | 82 | 82 | 82 |
| Branched PC | 18 | 18 | 18 | 18 | 18 | 18 | 18 |
| PETS | 0.35 | 0.35 | 0.35 | 0.35 | 0.35 | 0.35 | 0.35 |
| KPFBS | 0.08 | 0.08 | 0.08 | 0.08 | 0.08 | 0.08 | 0.08 |
| TSAN | — | 0.1 | 0.2 | 0.3 | 0.1 | 0.2 | 0.3 |
| Cyclic Siloxane | — | — | — | — | 0.1 | 0.1 | 0.1 |
| MVR, 6 min | 15.78 | 16.45 | 15.8 | 15.47 | 16.79 | 15.78 | 15.67 |
| MVR, 18 min | 16.18 | 16.39 | 16.28 | 16.07 | 16.8 | 16.48 | 16.73 |
| % Transmission | 90.3 | 75.1 | 66.2 | 61.3 | 76.4 | 65.1 | 60.7 |
| % Haze | 0.4 | 25.9 | 57.7 | 70.6 | 24.2 | 54.7 | 75.5 |
| p (FTP) 2.3 mm | 0.934 | 0.9999 | 1 | 1 | 1 | 1 | 1 |
| Average Flame Out Time in seconds | 2.2 | 1.5 | 1.2 | 1.1 | 1.4 | 1.1 | 1 |

*Comparative example

By comparing the results of Comparative Examples 13, 15, 16, 18, and 19 to Examples 14 and 17 it is evident that levels of polytetrafluoroethylene of 0.2 or greater result in compositions with high haze percentages and low light transmission percentages.

Examples 20–25.

[t5]

TABLE 4

| | 20* | 21* | 22 | 23 | 24 | 25 |
|---|---|---|---|---|---|---|
| Linear PC-1 | 88% | 70% | 88% | 88% | 88% | 88% |
| Branched PC | 12% | — | 12% | 12% | 12% | 12% |
| Linear PC-2 | — | 30% | — | — | — | — |
| PETS | 0.35 | 0.35 | 0.35 | 0.35 | 0.35 | 0.35 |
| KPFBS | 0.08 | 0.08 | 0.08 | 0.08 | 0.08 | 0.08 |
| TSAN | — | 0.1 | 0.1 | 0.1 | 0.1 | 0.1 |
| Cyclic Siloxane | 0.1 | 0.1 | — | 0.1 | 0.125 | 0.15 |
| MVR | 19.12 | 17.52 | 17.72 | 17.94 | 18.43 | 18.56 |
| p [FTP] 2.0 mm | Drip | Drip | 0.9925 | 0.9969 | 0.8842 | 0.8165 |
| p [FTP] 2.3 mm | 0.2749 | 0.057 | — | — | — | 0.9996 |
| % Haze | 0.5 | 20.8 | 26.7 | 20 | 21.2 | 20.3 |

TABLE 4-continued

|  | 20* | 21* | 22 | 23 | 24 | 25 |
|---|---|---|---|---|---|---|
| % Transmission | 90.6 | 76.1 | 74.2 | 77 | 76.7 | 77.3 |
| YI | 2 | 12.2 | 12.9 | 11.6 | 11.5 | 11.5 |

*Comparative examples

Examples 22 and 23 demonstrate that a V0 rating at a thickness of 2.0 mm can be achieved by compositions comprising branched and linear polycarbonate resins, a fire retardant free of bromine and chlorine, a fluorinated polyolefin and a siloxane.

Examples 26–31.

[t6]

TABLE 5

|  | 26 | 27 | 28 | 29 | 30 | 31 |
|---|---|---|---|---|---|---|
| Linear PC-1 | 80% | 88% | 95% | 80% | 88% | 95% |
| Branched PC | 20% | 12% | 5% | 20% | 12% | 5% |
| PETS | 0.35 | 0.35 | 0.35 | 0.35 | 0.35 | 0.35 |
| TSAN | 0.1 | 0.1 | 0.1 | 0.1 | 0.1 | 0.1 |
| KPFBS | 0.08 | 0.08 | 0.08 | 0.08 | 0.08 | 0.08 |
| Cyclic Siloxane | — | — | — | 0.1 | 0.1 | 0.1 |
| Melt Flow | 15.29 | 19.73 | 24.83 | 15.39 | 18.12 | 24.05 |
| p [FTP] 2.0 mm | 0.9696 | 0.9518 | 0.992 | 0.999 | 0.9804 | 0.5432 |
| p [FTP] 2.3 mm | 1 | 0.9707 | 0.9965 | 0.9972 | 0.9992 | 0.9933 |
| % Haze | 22.2 | 16.7 | 23.7 | 15.2 | 18 | 15.5 |
| & Transmission | 76.8 | 79.3 | 76.8 | 80.5 | 79.2 | 79.7 |
| YI | 11.5 | 10.3 | 11 | 9.6 | 10 | 9.8 |

In Examples 26–28 the relative amounts of linear polycarbonate resin and branched polycarbonate resin are varied in the absence of siloxane with a corresponding change in properties such as melt volume rate and percentage of haze. Examples 29–31 contain siloxane and vary the relative amounts of linear polycarbonate resin and branched polycarbonate resin similar to Examples 26–28. The addition of the siloxane results in a decrease in the percentage of haze without significantly affecting the other properties of the composition.

As can be seen by the preceding examples, it is now possible to obtain a V0 rating for a polycarbonate composition at a thickness of 2.0 mm without the loss of desired properties such as transparency. These compositions have sufficient melt volume rate to be useful in injection molding.

While preferred embodiments have been shown and described, various modifications and substitutions may be made thereto without departing from the spirit and scope of the invention. Accordingly, it is to be understood that the invention has been described by way of illustration and not limitation.

What is claimed is:

1. A fire retardant polycarbonate composition comprising; polycarbonate resin comprising branched polycarbonate; a polytetrafluoroethylene resin; and a fire retardant free of bromine and chlorine; wherein the polycarbonate composition has less than or equal to about 30% haze and greater than or equal to 70% light transmission at a thickness of about 3.2 millimeters and a V1 rating or better at a thickness less than or equal to 2.5 millimeters according to UL 94.

2. The composition of claim 1, wherein the polycarbonate resin has about 0.01 to about 0.15% branching.

3. The composition of claim 1, wherein the polytetrafluoroethylene resin is present in an amount of less than 0.1 weight percent (wt %) based on the total weight of the polycarbonate.

4. The composition of claim 3, wherein the polytetrafluoroethylene resin is present in an amount of less than or equal to about 0.075 wt % based on the total weight of the polycarbonate.

5. The composition of claim 4, wherein the polytetrafluoroethylene resin is present in an amount of less than or equal to about 0.05 wt % based on the total weight of the polycarbonate.

6. The composition of claim 1, wherein the polytetrafluoroethylene resin is encapsulated.

7. The composition of claim 1, wherein the fire retardant comprises an alkali or alkali metal salt of one or more of the following: a monomeric or polymeric aromatic sulfonic acid, a monomeric or polymeric aromatic sulfonesulfonic acid, a sulfonic acid of an aromatic ketone, a heterocyclic sulfonic acid, a fluorinated methanesulfonic acid, a fluorinated non-aromatic carboxylic acid, a sulfonic acid of an aromatic sulfide, a monomeric or polymeric aromatic ether sulfonic acid, an aliphatic sulfonic acid, an olefinic sulfonic acid, an unsubstituted or fluorinated oxocarbon acid, a sulfonic acid of a monomeric or polymeric aromatic carboxylic acids or ester, a fluorocycloaliphatic aromatic sulfonic acid, a monomeric or polymeric aromatic amide sulfonic acid.

8. The composition of claim 1, wherein the fire retardant is potassium perfluorobutane sulfonate.

9. The composition of claim 8, wherein the fire retardant is present in an amount of about 0.01 wt % to about 0.15 wt % based on the total weight of polycarbonate.

10. The composition of claim 9, wherein the fire retardant is present in an amount of about 0.03 wt % to about 0.12 wt % based on the total weight of polycarbonate.

11. The composition of claim 10, wherein the fire retardant is present in an amount of about 0.05 wt % to about 0.1 wt % based on the total weight of polycarbonate.

12. The composition of claim 1, further comprising a siloxane.

13. The composition of claim 12, wherein the siloxane is a cyclic siloxane.

14. The composition of claim 13, wherein the siloxane is a cyclic siloxane of the formula:

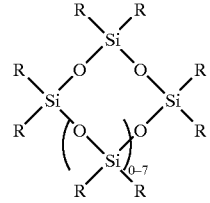

wherein each R is independently selected from the group consisting of alkyl groups having 1 to about 36 carbon atoms, alkoxy groups having 1 to about 36 carbon atoms, aryloxy groups having 6 to about 14 carbon atoms, arylalkoxy groups having about 7 to about 36 carbon atoms, aryl groups having 6 to about 14 carbon atoms, and alkyl substituted aryl groups having 6 to about 14 aryl carbon atoms wherein the alkyl substituent has 1 to about 30 carbon atoms.

15. The composition of claim 14, wherein the siloxane is selected from the group consisting of octaphenylcyclotetrasiloxane, octaphenoxycyclotetrasiloxane, and alkoxycyclosiloxanes.

16. The composition of claim 15, wherein the siloxane is octaphenylcyclotetrasiloxane.

17. The composition of claim 12, wherein the siloxane is present in an amount of about 0.01 wt % to about 0.25 wt % based on the total weight of the polycarbonate.

18. The composition of claim 17, wherein the siloxane is present in an amount of about 0.02 wt % to about 0.2 wt % based on the total weight of the polycarbonate.

19. The composition of claim 18, wherein the siloxane is present in an amount of about 0.05 wt % to about 0.15 wt % based on the total weight of polycarbonate.

20. A fire retardant polycarbonate composition comprising: polycarbonate resin comprising branched polycarbonate resin; polytetrafluoroethylene resin present in an amount less than about 0.1 weight percent based on the total weight of polycarbonate resin; and a fire retardant free of bromine and chlorine present in an amount of about 0.01 weight percent to about 0.15 weight percent based on the total weight of polycarbonate resin wherein the polycarbonate composition has a V1 rating or better at a thickness less than or equal to 2.5 millimeters according to UL 94.

21. The composition of claim 20, further comprising a siloxane.

22. A fire retardant polycarbonate composition comprising: polycarbonate resin comprising branched polycarbonate; polytetrafluoroethylene resin; fire retardant free of bromine and chlorine; and siloxane; wherein the polycarbonate composition has less than or equal to about 30% haze and greater than or equal to 70% light transmission at a thickness of about 3.2 millimeters and a V1 rating or better at a thickness less than or equal to 2.5 millimeters according to UL 94.

23. A fire retardant polycarbonate composition comprising: linear and branched polycarbonate resins; a polyfluorotetraethylene resin; a fire retardant free of bromine and chlorine; and a cyclic siloxane.

24. A fire retardant polycarbonate composition comprising; polycarbonate resin comprising branched polycarbonate; a polytetrafluoroethylene resin; and a fire retardant free of bromine and chlorine; wherein the polycarbonate resin has about 0.01 to about 0.15% branching and the polycarbonate composition has less than or equal to about 30% haze and greater than or equal to 70% light transmission at a thickness of about 3.2 millimeters and a V1 rating or better at a thickness less than or equal to 2.5 millimeters according to UL 94.

* * * * *